United States Patent Office 3,498,834
Patented Mar. 3, 1970

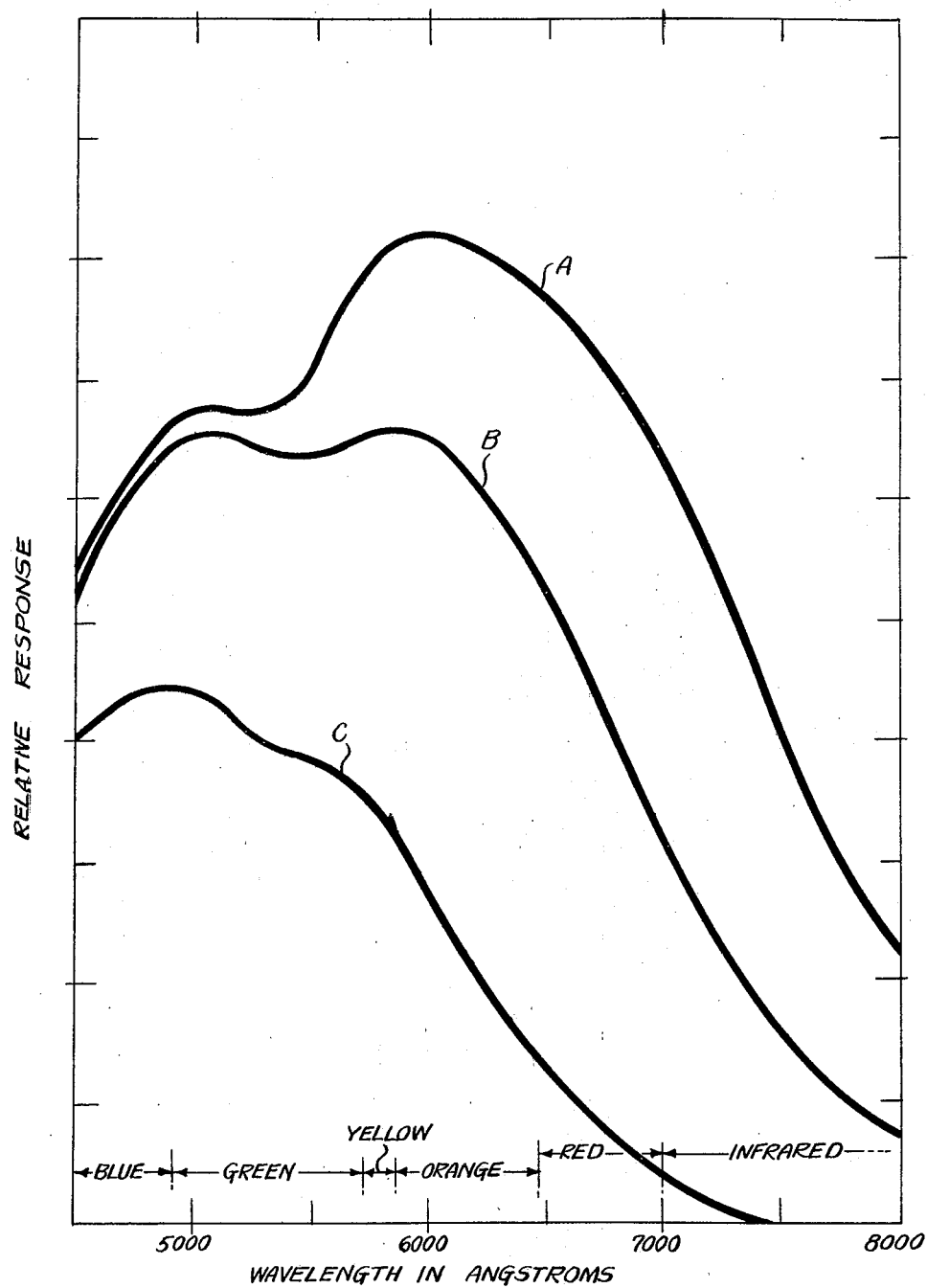

3,498,834
PHOTOELECTRIC SURFACES AND METHODS
FOR THEIR PRODUCTION
Martin Rome, Princeton, Robert E. Friebertshauser,
Princeton Junction, and Joseph S. Di Benedetto, Jr.,
Trenton, N.J., assignors, by mesne assignments, to
Weston Instruments, Inc., Newark, N.J., a corporation of Delaware
Filed Feb. 3, 1967, Ser. No. 613,877
Int. Cl. B44d 1/18; C23b 5/64
U.S. Cl. 117—217              13 Claims

ABSTRACT OF THE DISCLOSURE

Photosensitive electron-emissive surfaces, especially photocathodes for photomultiplier tubes and the like, are provided which comprise antimony and effective quantities of the alkali metals potassium, sodium, rubidium and cesium. The photoemissive surfaces have improved overall sensitivity and, particularly, a markedly improved response to light in the green-red portion of the spectrum. Such surfaces are produced by first establishing a supported layer of antimony, or of antimony and potassium, and then introducing potassium, sodium, rubidium and cesium into the layer at temperatures promoting reaction of antimony with the alkali metals, with the rubidium being introduced after sodium, or both sodium and potassium, have been introduced and before introduction of cesium. With inclusion of rubidium as well as sodium, potassium and cesium in this manner, photo-emissive sensitivities exceeding 350 microamperes per lumen are attained, and response improvements of 25–300% over conventional trialkali (sodium-potassium-cesium) electrodes are achieved in the long wavelength region of the spectrum.

---

Figure 1:
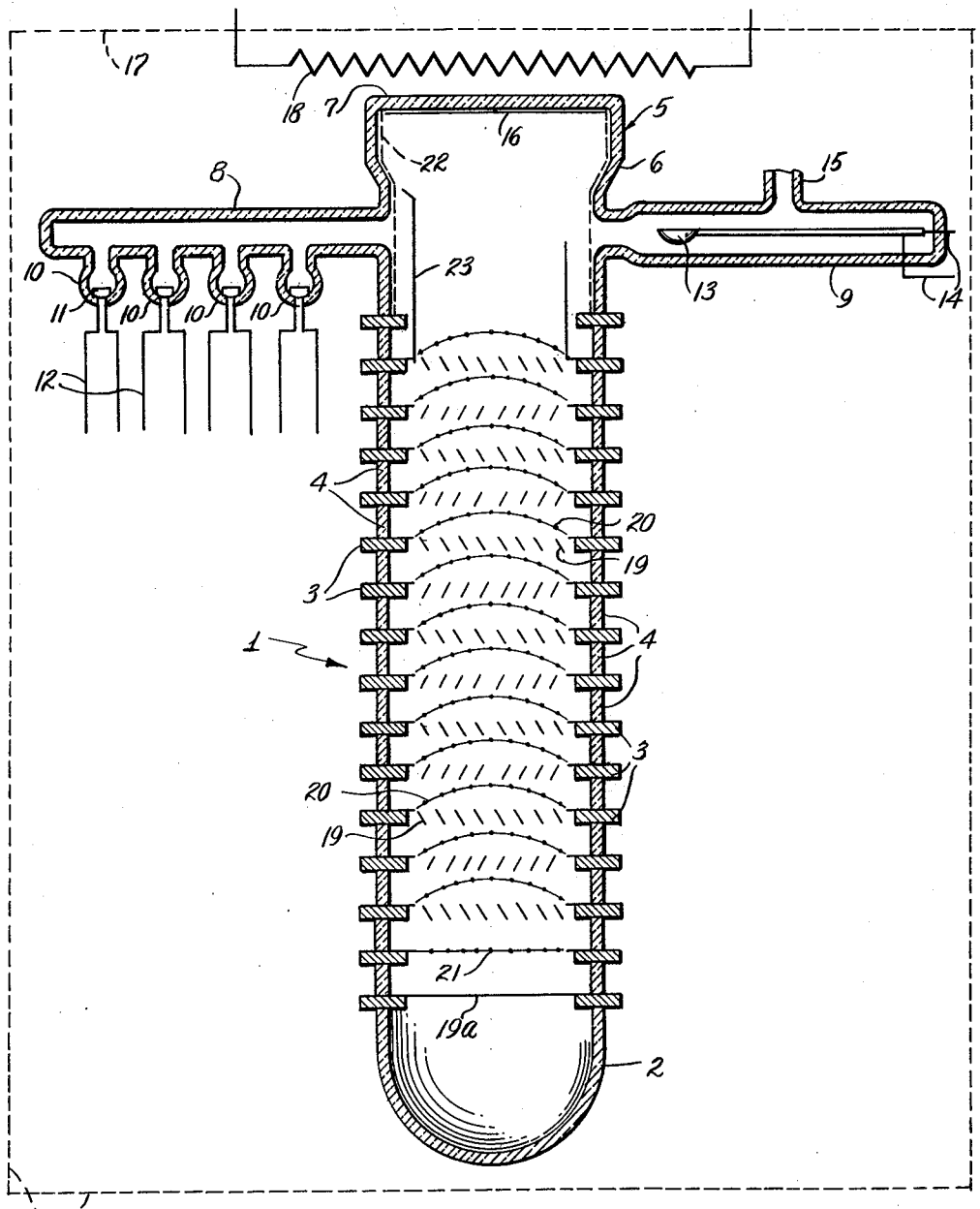

This invention relates to photosurfaces and their production and, more particularly, to an improved method for producing photo-emissive electrodes and to the electrodes so produced.

It has long been known to produce photocathodes by establishing on a suitable support an antimony layer including cesium. Prior-art workers also proposed to use a second alkali metal, in addition to cesium, in efforts to improve the photo-emissive characteristics of the electrodes. However, though much work was done over a considerable period of time, the results were not promising and most prior-art workers concluded that the inclusion of other alkali metals in addition to cesium was not desirable. Despite this experience, it was subsequently discovered that use of antimony and three alkali metals gives superior results, particularly with sodium, potassium and cesium employed as the alkali metals, as disclosed in U.S. Patent 2,770,561, issued Nov. 13, 1956, to Alfred G. Sommer. Such photo-emissive electrodes have achieved considerable commercial success. However, they have the disadvantage that the photo-emissive sensitivity peaks in a portion of the light spectrum such that the response is good to light in the blue portion of the spectrum but poor for light in the red portion, and there has accordingly been a continuing need for photo-electrodes with improved photo-emissive sensitivity in the green-red portion of the spectrum.

A general object of this invention is therefore to provide a photo-emissive electrode which not only has improved overall sensitivity but also exhibits good response in the spectral range above 5000 A.

Another object is to devise an improved method for producing photo-emissive cathodes and the like which have markedly improved photo-emissive sensitivity above 5000 A, and also have a high peak quantum efficiency and a low dark current.

A further object is to provide photocathodes having all of the advantages of photocathodes made up of antimony and the alkali metals sodium, potassium and cesium and also having a markedly improved photo-emissive response in the spectral region above 5000 A.

Yet another object is to provide improved multiplier phototubes wherein the secondary emission properties of the dynodes are significantly enhanced, so that desired current amplifications can be obtained at lower voltages.

In order that the manner in which the foregoing and other objects are attained in accordance with the invention can be understood in detail, particularly advantageous embodiments thereof will be described with reference to the accompanying drawings, which form part of this specification, and wherein:

FIG. 1 is a semi-diagrammatic longitudinal cross-sectional view of a multiplier phototube, illustrating the same at the stage of deposition of the photocathode; and FIG. 2 is a graph illustrating spectral response of photocathodes to light in the range from 4500 A. to 8000 A. from a tungsten lamp operated as a standard illumination source at 2870° K. color temperature.

Method embodiments of the invention provide an advantageous procedure by which rubidium is introduced as a fourth alkali metal, producing a photo-emissive surface which not only exhibits none of the adverse effects which would be expected from the addition of another alkali metal but also shows marked improvement in sensitivity in the spectral range above 5000 A. According to particularly advantageous embodiments of the method, an initial layer of antimony, or of potassium and antimony, is first established on a support or substrate, sodium is then introduced into the layer by vapor-deposition, potassium and rubidium are then vapor-deposited successively, with the successive depositions being repeated until a desired level of photo-emissive sensitivity is attained, and cesium is then vapor-deposited to complete the photo-emissive surface, introduction of the cesium increasing the photo-emissive sensitivity to a maximum value which can exceed 350 microamperes per lumen. The initial layer can advantageously be provided by co-depositing potassium and antimony on the substrate. Additional amounts of antimony can advantageously be deposited as the method proceeds with deposition of the potassium, rubidium and cesium after deposition of the sodium. A primary characteristic of the method, however, is introduction of rubidium in addition to potassium, sodium and cesium, with the rubidium being added after the sodium and prior to introduction of the cesium.

The products resulting from the method are new and improved photo-emissive surfaces made up of antimony with the alkali metals potassium, sodium, rubidium and cesium, with a preponderant proportion of the antimony being present in the form of alkali metal reaction products.

Success of the method, and the improved nature of the photo-emissive surfaces produced thereby, are surprising in view of the fact that no significant improvement in sensitivity is realized by substituting rubidium for one of the constituents of the conventional bialkali (antimony-sodium-potassium) photo-emissive surfaces, or for one of the constituents in the conventional trialkali (antimony-sodium-potassium-cesium) photo-emissive surfaces. Similarly, if the prior-art procedures for making a trialkali photo-emissive surface, using antimony, sodium, potassium and cesium, are followed and rubidium is then introduced after the cesium, there is again no significant improvement in sensitivity.

The reasons for success of the method and for the superior nature of the photo-emissive surfaces obtained are not fully understood. It is accepted that, at the temperatures employed, vapor-deposition of the alkali metals onto antimony, or co-deposition of antimony with the alkali metals, results in reaction of the antimony with the alkali metals. Thus, sodium reacts with antimony to produce sodium antimony ($Na_3Sb$), potassium and antimony react to form potassium antimony ($K_3Sb$), rubidium forms rubidium antimony ($Rb_3Sb$), and cesium reacts to form cesium antimony ($Cs_3Sb$). Formation of such compounds has been explained on the assumption that antimony is electronegative with respect to the alkali metals and that one atom of antimony is covalently bonded with three alkali metal atoms. Success of the invention can be explained on the basis that substantially all of the antimony is reacted with alkali metal, repetition of the successive depositions of potassium, antimony, rubidium and antimony in addition to the initial antimony deposition and the final deposition of cesium, results in a near stoichiometric reaction, with the reaction products containing 1 atom of antimony for each 3 atoms of alkali, there being an excess of alkali metal, probably cesium, which is probably interstitially disposed rather than chemically bound. In the final product, the alkali metals are believed to be in the ratio of more than 2 atoms of sodium to less than 1 atom of potassium, less than 1 atom of rubidium and considerably less than 1 atom of cesium.

In a typical and particularly effective embodiment of the method, a photocathode is prepared by first vapor-depositing antimony and potassium onto a suitable supporting surface or substrate such as glass, this co-deposition being accomplished by evaporating the antimony and potassium onto the substrate while maintaining the substrate at 150–175° C. The initial deposition of antimony and potassium is continued until the resulting film attains a maximum photo-emissive response of approximately 1 microampere per lumen. Sodium is then evaporated onto the initial potassium-antimony layer, while maintaining the substrate and layer at 200–215° C., until the photo-emissive response increases by approximately 2 microamperes per lumen and then decreases to about 0.5 microampere per lumen. After such decrease has occurred, successive vapor-depositions of potassium, antimony, rubidium and antimony are made by evaporating the metals while maintaining the substrate and layer at 150–175° C., and the cycle of successive depositions is repeated 6–20 times, the photo-emissive response increasing to a peak on the introduction of each alkali metal and then decreasing to 25–50% of that peak as the antimony is deposited. Repetition of the successive depositions of potassium, antimony, rubidium and antimony is continued until the photo-emissive sensitivity has increased to a maximum of approximately 100 microamperes per lumen. In most cases, this maximum can be achieved by repeating the successive depositions 10–12 times, though a greater or lesser number of repetitions, within the range of 6–20 stated above, can be employed. Finally, cesium and antimony are vapor-deposited, either successively or by co-depositing, with the substrate temperature maintained at 140–160° C., until the photo-emissive sensitivity reaches a desired final maximum, which can exceed 350 microamperes per lumen at room temperature.

Vapor deposition of the antimony and the four alkali metals can be accomplished by using conventional vacuum techniques. Typically, the antimony is provided by heating the pure metal at 450–550° C. to vaporize the metal. For the alkali metals, the corresponding chromate is used as the source material and is mixed with powdered aluminum and powdered tungsten, the mixture being heated to produce the desired alkali metal by thermal reduction. For sodium, the mixture is heated to 625–825° C. For potassium and rubidium, temperatures of 600–800° C. are employed. For cesium, the reduction is accomplished at 600–750° C.

One typical manner in which the invention can be practiced, and one typical product embodiment thereof, is illustrated in FIG. 1. Here, a multiplier phototube is indicated generally at 1 and includes a sealed, generally cylindrical envelope comprising a glass end closure 2, a plurality of spaced parallel flat metal rings 3, a plurality of short cylindrical glass rings 4 each disposed between and sealed to the two rings 3 of a different adjacent pair of such rings, and a glass end closure 5 comprising a cylindrical body 6, sealed to the adjacent one of rings 4, and a flat circular window portion 7. Hollow side stems 8 and 9 extend radially outwardly from cylindrical body 6. Stem 8 includes four dependent bulbs 10 each containing a small dished receptacle 11 which can be heated to a controlled elevated temperature by means of an electrical resistance element (not shown) supplied with current via conductors 12. Side stem 9 accommodates a boat 13 which can be heated to a controlled elevated temperature by an electrical resistance element (not shown) supplied with current via wires 14. Stem 9 has a branch 15 via which the envelope is evacuated and held under vacuum conditions throughout vapor deposition of antimony and the alkali metals to establish the photo cathode 16 on the inner surface of window portion 7. The phototube is disposed in an oven, indicated by broken lines 17, the oven being heated in any suitable fashion, as by resistance element 18.

The phototube includes a plurality of "venetian blind" dynodes 19 each connected to a different one of the rings 3, each dynode being equipped with a field shaping screen 20. Adjacent end closure 2, the end one of rings 3 is connected to the last dynode 19a, and the next adjacent ring 3 is connected to the anode 21. The ring 3 at the opposite end of the series of rings serves as the cathode contact, being connected to the photo cathode 16 via a metallic coating indicated by broken lines at 22 carried by the cylindrical body 6. The ring 3 next adjacent to the cathode contact ring carries and is connected to a focusing electrode indicated at 23, in addition to its dynode 19.

A first one of the receptacles 11 contains a mixture of 1 part by weight of potassium chromate, 1 part by weight of powdered aluminum and 6 parts by weight of powdered tungsten. A second one of the receptacles contains a mixture of sodium chromate, powdered aluminum and powdered tungsten, in the same proportions by weight. The third receptacle 11 contains a mixture of rubidium chromate, powdered aluminum and powdered tungsten, again in the same proportions as the potassium-containing mixture. The fourth receptacle 11 contains a mixture of cesium chromate, powdered aluminum and powdered tungsten, again in the same weight proportions. Boat 13 contains pure antimony 11.

To prepare for vapor deposition of the photo cathode 16, the phototube envelope is evacuated conventionally to establish therein a pressure on the order of $10^{-7}$ mm. of mercury (this pressure being maintained until the photo cathode has been completed), and the oven 17 is heated to bring the temperature of the phototube envelope, and therefore window portion 7, to approximately 165° C. The one of receptacles 11 containing the potassium chromate, and the boat 13, are then heated concurrently, the receptacle being heated to 800° C. and the boat to 550° C. Such heating results in vaporization of potassium and antimony, so that those two metals are vapor-deposited concurrently on the inner surface of window portion 7. The concurrent vapor deposition of the potassium and antimony is continued until the photo cathode exhibits a photo-emissive response (measured conventionally) of approximately 1 micro-ampere per lumen.

The initial co-deposition of antimony and potassium having been completed, providing on window portion 7 an initial layer comprising antimony and the reaction product potassium antimony, oven 17 is adjusted to bring window portion 7 to a temperature of about 210° C., and the receptacle 11 carrying the sodium chromate-containing mixture is heated to 825° C., so that sodium metal is vaporized and deposited on the initial layer. Deposition of sodium is continued until the response of the cathode has first increased to about 2 microamperes per lumen and then decreased to about 0.5 microampere per lumen. As a result of this step, sodium has been introduced into the deposited layer and caused to react with a portion of the antimony therein.

After termination of vaporization of the sodium, the oven 17 is adjusted to decrease the temperature of the phototube envelope, and thus of window portion 7, to approximately 165° C. and the one of receptacles 11 containing potassium is again heated to 800° C. to vaporize and deposit potassium on the cathode layer. Heating is continued until the photo-emissive response of the layer attains a definite peak, heating of the potassium chromate-containing mixture then being terminated. Boat 13 is then heated to 550° C. to vaporize and deposit additional antimony and this heating is continued until the photo-emissive response of the layer has decreased to about 30% of the peak which resulted from deposition of the potassium, at which point heating of the boat is discontinued. The receptacle 11 carrying the rubidium-chromate containing mixture is then heated to about 800° C., causing vaporization and deposition of rubidium, and this heating is continued until the photo-emissive response has again increased to a definite peak, heating of that receptacle then being discontinued. Deposition of antimony is then again commenced by heating boat 13 to about 800° C., this step being continued until the photo-emissive response has decreased to about 30% of the peak last obtained.

The latter deposition of antimony completes a 4-step cycle commencing with the potassium deposition which followed the deposition of sodium. This cycle is repeated 12 times, resulting in a photo-emissive response for the cathode layer of approximately 100 microamperes per lumen. At this stage, the deposited photocathode layer is constituted by antimony, potassium, sodium and rubidium, with a preponderant proportion of the antimony being reacted with the three alkali metals and with a portion of the reaction product containing both rubidium and at least one of the other two alkali metals.

To complete the photo cathode, the one of receptcles 11 carrying the cesium chromate-containing mixture and the boat 13 are heated, the receptacle being heated to about 750° C. and the boat to 550° C. While window portion 7 is maintained at about 160° C., cesium and antimony are vapor-deposited concurrently on the inner surface of the window portion. This step is continued until the photo-emissive response of the photo cathode reaches a desired maximum which is often in excess of 350 microamperes per lumen when measured at room temperature. The side arms are then sealed off and removed, leaving the envelope completely sealed and under vacuum.

The resulting photocathode has special utility in those applications for which trialkali photocathodes have become accepted, and has the major advantage of markedly greater sensitivity to light in the green-red range, about 5000 A., as illustrated in FIG. 2. The three curves illustrate the spectral response, averaged for a representative number of samples, for three different types of photocathodes. Curve A is for photocathodes produced by the method of this invention as described above and comprising a photosurface containing antimony and the alkali metals sodium, potassium, rubidium and cesium. Curve B is for conventional trialkali photocathodes of the prior art, comprising an antimony photosurface containing sodium, potassium and cesium and made, for example, in accordance with aforementioned U.S. Patent 2,770,561. Curve C is for conventional bialkali photocathodes of the prior art, comprising an antimony photosurface containing sodium and potassium. Each curve of the graph is obtained by plotting the average sensitivity values, in arbitrary units, for the representative samples of each type of photocathode, against wavelength in anstroms using a Tungstom lamp at 2870° K. illuminant. From these curves, it will be seen that the average of the response for the samples prepared in accordance with the invention is markedly greater than that for the conventional trialkali photocathodes, the improvement approaching 50% at 6500 A. and 100% at 7000 A. In individual cases, the photocathodes prepared in accordance with this invention show a response improvement in the range of 25–300% over the conventional trialkali photocathodes of the prior art in the long wavelength region.

Typical luminous sensitivity values for the three types of photocathodes, expressed in microamperes per lumen, are 226 for the photocathodes of curve A, 165 for those of curve B, and 70 for those of curve C.

In addition to greater overall sensitivity and the marked improvement in response to light in the green-red portion of the spectrum, photocathodes prepared as described above have high quantum efficiency and, when used in phototomultiplier tubes, substantially enhance the secondary emission ratio of the dynodes, resulting in a reduction of 30% or more in the voltage required to obtain a current amplification of 1 million. Further, thermionic dark currents are as much as 3 times lower for the photocathodes of the invention than for trialkali photocathodes of even lower sensitivity, so that a substantial improvement in signal-to-noise ratio is obtained.

Vapor deposition of the metals can be accomplished by any of the conventional techniques known to those skilled in the art, and any suitable substrate, particularly including glass, glass coated with aluminum, metals such as aluminum, chromium. copper and nickel which do not react with the constituents of the photo surface, lithium fluoride, magnesium fluoride and like single crystal materials, fused silica or quartz, and sapphire, can be employed to support the antimony layer or film. It will be understood that the invention is applicable both to semi-transparent electrodes, in which the direction of electron emission is the same as the direction of light impingement, and to reflective electrodes, in which the direction of electron emission is opposite to the direction of light impingement.

What is claimed is:

1. A method for producing a photosensitive electron-emissive electrode characterized by a markedly improved photo-emissive sensitivity in the spectral range about 5000 A., high quantum efficiency, and low dark current, comprising the steps of initially vapor-depositing sodium on a supported antimony layer until the photo-emissive sensitivity increases to a peak value and then decreases to a value on the order of 25% to 50% of said peak value; then successively vapor-depositing potassium and rubidium; repeating the successive vapor-disposition of pootassium and rubidium a plurality of times until the photo-emissive sensitivity reaches a value on the order of 100 microamperes per lumen; and then vapor-depositing cesium.

2. A method according to claim 1, wherein the successive deposition of potassium and rubidium is repeated 6–20 times.

3. A method according to claim 1, wherein antimony is also vapor-deposited for each deposition of potassium and rubidium.

4. A method according to claim 3, wherein antimony is vapor-deposited after each disposition of potassium and after each deposition of rubidium in said step of successively vapor-depositing potassium and rubidium; each deposition of potassium and each deposition of rubidium in said step of successively vapor-depositing potassium and rubidium is terminated when the photo-emissive response has reached a peak; and each said deposition of antimony which follows a deposition of potassium or rubidium in said step of successively vapor-depositing potassium and rubidium is terminated when, as a result of antimony deposition, the photo-emissive response has decreased to 30–50% of the peak resulting from the preceding deposition of potassium or rubidium.

5. A method according to claim 1, wherein said antimony is prepared by concurrently vapor-depositing antimony and potassium on a supporting substrate until a photo-emissive sensitivity of about 1 microampere per lumen is attained.

6. A method according to claim 5, wherein the concurrent initial vapor-deposition of potassium and antimony is carried out at a substrate temperature of 150–175° C.

7. A method according to claim 6, wherein said vapor-deposition of sodium is carried out at a substrate temperature of 200–215° C.

8. A method according to claim 7, wherein the successive deposition of potassium and rubidium is carried out at a substrate temperature of 150–175° C.

9. A method according to claim 8, wherein the successive deposition of potassium and rubidium is repeated 10–12 times.

10. A method for producing a photosensitive electron-emissive electrode comprising antimony with alkali metals including rubidium, comprising the steps of establishing a supported layer of a material selected from the group consisting of antimony and potassium and antimony; initially vapor-depositing sodium on said layer while maintaining the layer at a substrate temperature of about 200° C. to 215° C. and thereby providing a sodium-antimony layer; successively vapor-depositing potassium and rubidium on said layer while maintaining said layer at a temperature of about 150° C. to 175° C. and repeating the successive vapor-deposition of potassium and rubidium 6–20 times to provide significant amounts of potassium and antimony and of rubidium and antimony; and then vapor-depositing cesium.

11. A method according to claim 10, wherein additional antimony is vapor-deposited for each deposition of potassium and rubidium.

12. A method according to claim 10, wherein said supported layer is initially established by concurrent vapor-deposition of antimony and potassium on a substrate while maintaining said substrate at a temperature of 150–175° C.

13. A method according to claim 10, wherein antimony is vapor-deposited after each deposition of potassium and after each deposition of rubidium in said step of successively vapor-depositing potassium and rubidium; each deposition of potassium and each deposition of rubidium in said step of successively vapor-depositing potassium and rubidium is terminated when the photo-emissive response has reached a peak; and each said deposition of antimony which follows a deposition of potassium or rubidium in said step of successively vapor-depositing potassium and rubidium is terminated when, as a result of antimony deposition, the photo-emissive response has decreased to 30–50% of the peak resulting from the preceding deposition of potassium or rubidium.

References Cited

UNITED STATES PATENTS

| 2,914,690 | 11/1959 | Sommer | 117—217 |
| 2,977,252 | 3/1961 | Causse et al. | 117—217 |
| 3,006,786 | 10/1961 | Sjoberg | 117—219 |
| 0,023,131 | 2/1962 | Cassman | 117—219 |

ALFRED L. LEAVITT, Primary Examiner

C. K. WEIFFENBACH, Assistant Examiner

U.S. Cl. X.R.

117—211, 225, 227; 313—65, 94